(12) United States Patent
Lewontin et al.

(10) Patent No.: US 6,829,758 B1
(45) Date of Patent: Dec. 7, 2004

(54) INTERFACE MARKUP LANGUAGE AND METHOD FOR MAKING APPLICATION CODE

(75) Inventors: Steve Lewontin, Cambridge, MA (US); Leon Thrane, Woburn, MA (US)

(73) Assignee: Nokia Internet Communications, Inc., Mountain View, CA (US)

( * ) Notice: Subject to any disclaimer, the term of this patent is extended or adjusted under 35 U.S.C. 154(b) by 438 days.

(21) Appl. No.: 09/617,253

(22) Filed: Jul. 14, 2000

(51) Int. Cl.[7] .............................................. G06F 9/44
(52) U.S. Cl. .................................................... 717/107
(58) Field of Search ........................................ 717/109

(56) References Cited

U.S. PATENT DOCUMENTS

| | | | |
|---|---|---|---|
| 6,397,355 B1 * | 5/2002 | Curtis et al. ................... | 714/38 |
| 6,430,570 B1 * | 8/2002 | Judge et al. ............ | 707/103 R |
| 6,442,748 B1 * | 8/2002 | Bowman-Amuah ......... | 717/108 |
| 6,480,860 B1 * | 11/2002 | Monday ...................... | 707/102 |
| 6,490,564 B1 * | 12/2002 | Dodrill et al. ............... | 704/275 |
| 6,505,342 B1 * | 1/2003 | Hartmann et al. ........... | 717/104 |
| 6,523,037 B1 * | 2/2003 | Monahan et al. ............. | 707/10 |
| 6,741,909 B2 * | 5/2004 | Leatherman et al. ........ | 700/234 |

OTHER PUBLICATIONS

User Interface Markup Language Draft Specification, Version 2.0, Harmonia, Inc., Jan. 17, 2000, pp. 1–64.*
Jassen, Bill, Inter–Language Unification (ILU) 2.0beta1 Reference Manual, Xerox, Inc., May 30, 2000, pp. 1–44.*
Bean Markup Language (Version 2.3) User's Guide, S. Weerawarana et al IBM TJ Watson Research Center, Sep. 22, 1999.*
Bean Markup Language (Version 2.3) Tutorial, J. Kesselman et al. IBM TJ Watson Research Center, Sep. 22, 1999.*
Rational Rose, Using Rational Rose, Chapters 10–11, 1996.*
Marc Abrams et al., "UIML: an appliance–independent XML user interface language", Computer Networks, Elsevier Science Publishers B.V., Amsterdam, NL, vol. 31, No. 11–16, May 1999.

* cited by examiner

*Primary Examiner*—Todd Ingberg
(74) *Attorney, Agent, or Firm*—Antonelli, Terry, Stout & Kraus, LLP

(57) ABSTRACT

An Interface Markup Language ("IML") file specifies abstract server interface definitions called "operations" that return abstract content descriptions called "entities". Each entity specifies a set of operations that the entity can invoke. The combined set of entities and operations together define an abstract flow diagram of an application. A computer readable medium has instructions stored thereon which, when executed by a processor, cause the processor to perform a sequence of steps in order to make application code that is based on a flow diagram of an application. The steps include making an IML file that includes an operation list section delimited by an operation list marker and an entity list section delimited by an entity list marker. The operation list section specifies a series of operations supported by an application server. The entity list section describes a set of entities which constitute an interface to an application running on the application server. The steps further include compiling the IML file to make application code.

32 Claims, 5 Drawing Sheets

INTERFACE MARKUP LANGUAGE AND METHOD FOR MAKING APPLICATION CODE

FIELD OF THE INVENTION

This invention relates generally to application design and coding, and more particularly to an interface markup language and a method for making application code.

BACKGROUND OF THE INVENTION

It is difficult to bridge the gap between the highly abstract design of an application and the details of coding. A distributed application, such as a Web-based application, can often be described functionally as a set of user interface screens that invoke server actions: for example, in a WAP application a WAP login screen that accepts a user name and password and then invokes a login on the server. Such an application can easily be represented as a state diagram: for example, as a graph consisting of user interface screens linked together by lines representing possible control flows from screen to screen, such as, for example, the login screen linked to an initial menu screen, etc. Such diagrams make it easy to represent the functional flow of the application and refine the user interface design. Such applications are traditionally written entirely by hand or using visual development tools to design screens.

A screen designer, however, only solves the problem of screen layout, not application flow. Interface description languages (IDL) have been used to provide abstract specifications of remote operations (such as remote procedure calls). Such operations, however, cannot be used directly to construct an abstract state diagram of the application. It is very difficult to manually generate application code directly from such a diagram. Each action invokes a server operation which in turn both invokes server side application logic (for example, the login operation) and must generate the next user interface screen (for example, the initial menu screen). As such, there continues to be a need for a solution to the aforementioned difficulties in application design and coding.

SUMMARY OF THE INVENTION

The invention provides an Interface Markup Language ("IML") and a method of making application code. In accordance with a specific embodiment of the invention, application code is made from an IML file. The IML file specifies abstract server interface definitions called "operations" that return abstract content descriptions called "entities". Each entity specifies a set of operations that the entity can invoke. The combined set of entities and operations together define an abstract flow diagram of an application.

In accordance with another specific embodiment of the invention, a computer readable medium has instructions stored thereon which, when executed by a processor, cause the processor to perform a sequence of steps in order to make application code that is based on a flow diagram of an application. The steps include making a file that includes an operation list section delimited by an operation list marker and an entity list section delimited by an entity list marker. The operation list section specifies a series of operations supported by an application server. The entity list section describes a set of entities which constitute an interface to an application running on the application server. The steps further include compiling the file to make application code.

Other aspects and advantages of the invention will become apparent from the following detailed description and accompanying drawings, illustrating by way of example the features of the invention.

DETAILED DESCRIPTION

The preferred embodiment is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

The Interface Markup Language ("IML") is a meta-language for specifying distributed applications, such as Web-based applications. It can be used to develop applications for any of the Web-based markup languages, such as WML (WAP) and HTML. IML provides a series of abstractions for describing both the user interface state model (for example, screens and navigation among them) and server operations that result in navigation from state to state. IML can be used by the programmer to create an abstract description of the application that corresponds to a functional model such as a flow diagram; or, it can be generated using a visual development tool from an on-screen representation of such a functional model. The IML description can then be compiled by the IML compiler to generate much (in some cases, all) of the application code automatically.

Figure 1:
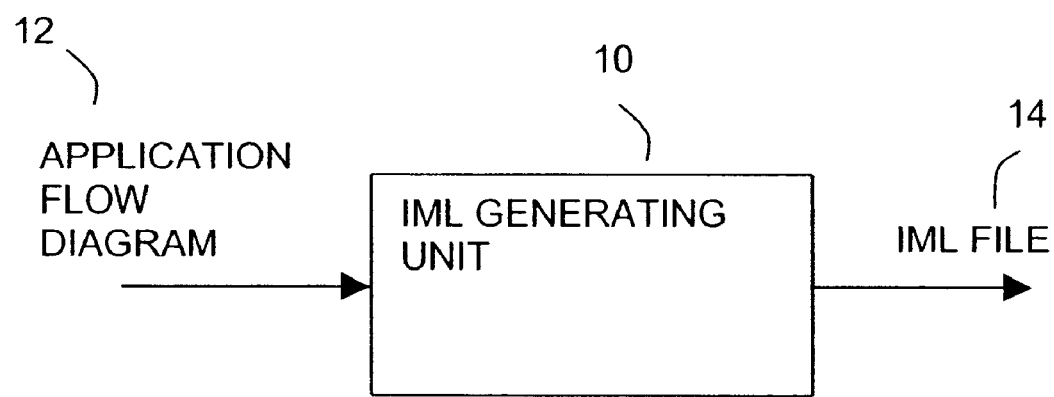
FIG. 1 is a schematic view of an IML generating unit in accordance with the principles of the invention.

Referring to FIG. 1, an IML generating unit 10 embodied in accordance with the principles of the invention receives an application flow diagram 12, created, for example, by a user at a workstation. Responsive to input of the application flow diagram, the IML generating unit 10 produces an IML file 14 based on the application flow diagram 12.

Figure 2:
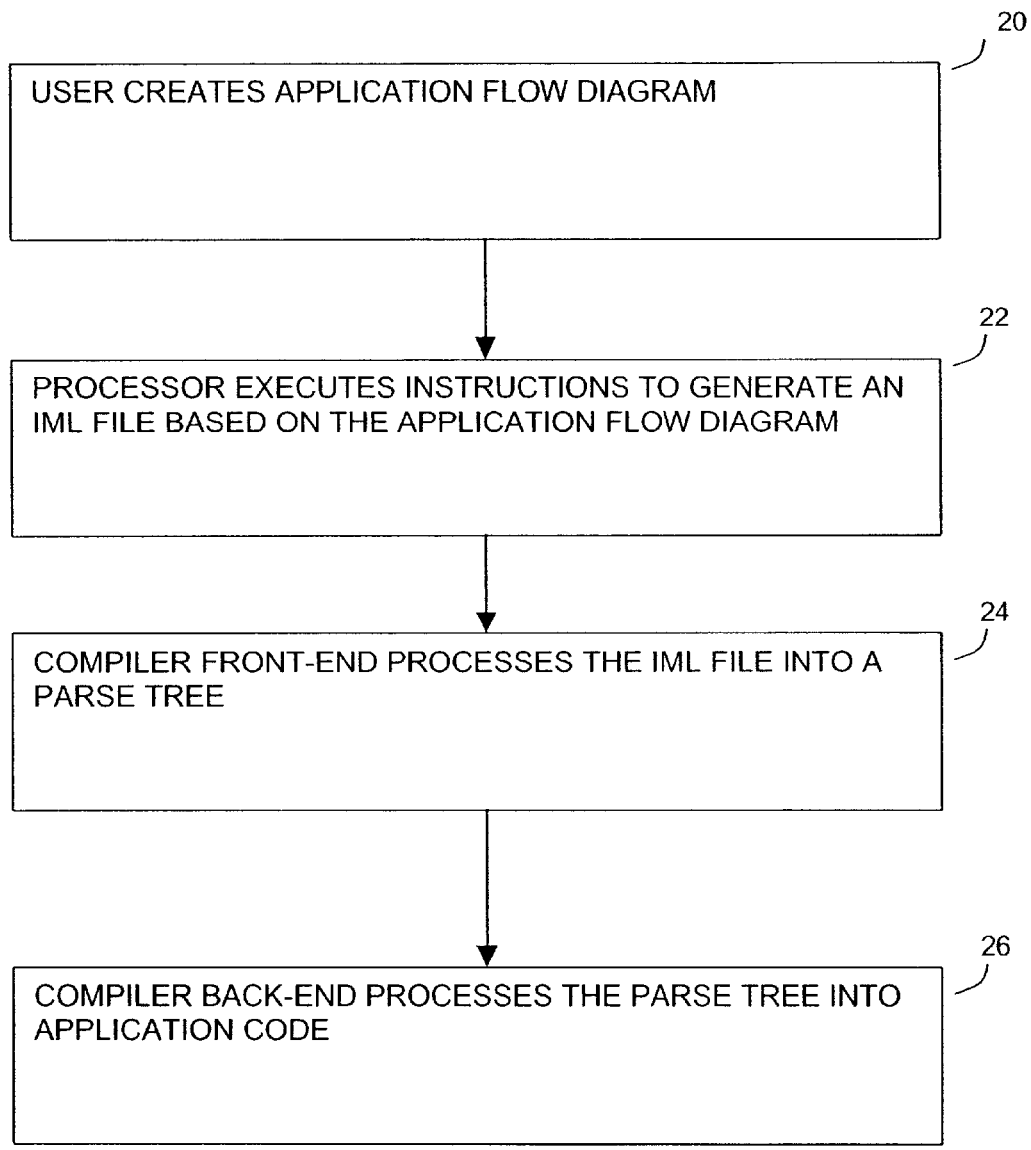
FIG. 2 is a flow diagram depicting a process of generating an IML file in accordance with the principles of the invention.

FIG. 2 is a process flow diagram depicting a process of generating an IML file in accordance with the principles of the invention. In the specific embodiment illustrated in FIG. 2, the process is executed by the IML generating unit 10 (FIG. 1). An example of the structure of the IML generating unit 10 is discussed in detail below with respect to FIG. 5. Referring to FIG. 2, the user creates an application flow diagram in step 20. The IML generating unit generates an IML file in step 22. A compiler front-end processes the IML file into a parse tree in step 24. The compiler is described in more detail subsequently with respect to FIG. 4. In step 26, the compiler back-end processes the parse tree into application code.

IML is a language that describes the structure and interfaces of network-based applications such as WAP applications. IML combines abstract server interface definitions, which are referred to as "operations", with a set of abstract content descriptions, which are referred to as "entities", in such a way as to specify a state diagram of the application.

This state diagram specifies application flow as a graph of abstract user interface elements connected by the operations they invoke. IML is unique and different from other interface definition languages because it specifies operations that return entities rather than data types. Because each entity in turn specifies a set of operations that it can invoke, the combined set of entities and operations together define an abstract flow diagram of the application.

Because IML provides a highly abstract description of the user interface and application flow, it can be used to model the application at the design state. Once an IML specified design has been created, it can be compiled by an IML compiler to generate much of the application code automatically.

While IML can be written by programmers directly, it is also designed to function as the data model for a visual development environment. In such an environment, the application is represented graphically and the programmer need only manipulate the graphical representation to generate IML and application code.

IML can be implemented as an XML-based language, although the features of IML can be implemented using a non-XML syntax as well. The eXtensible Markup Language ("XML") is an open standard defined by the World Wide Web Consortium (W3C). XML is an open architecture for application development and a globally accepted specification for exchanging complex structured data. XML was designed to provide a metalanguage standard that could be used to describe metadata.

Figure 3:
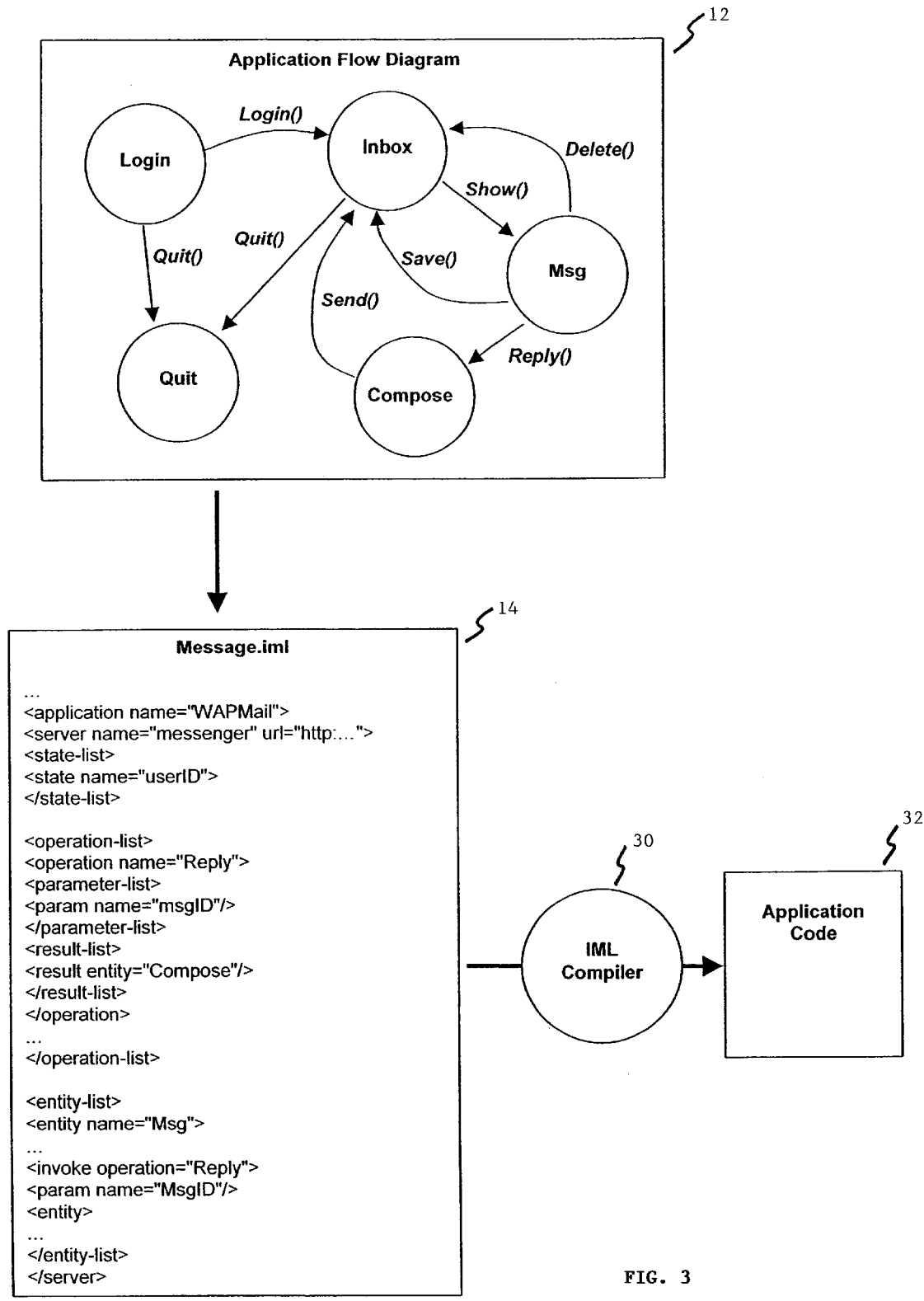
FIG. 3 is a flow diagram depicting a process of generating application code in accordance with the principles of the invention.

FIG. 3 schematically illustrates the application flow diagram 12, the IML file 14, an IML compiler 30, and application code 32 in further detail. The abstract flow diagram 12 shown in FIG. 3 is for a sample messaging application that allows reading, replying to, deleting, and saving of messages. FIG. 3 also shows a fragment of the corresponding IML description 14, called "message.iml". This is processed by the IML compiler 30 to generate application code 32, such as, e.g., a Java servlet.

Figure 4:
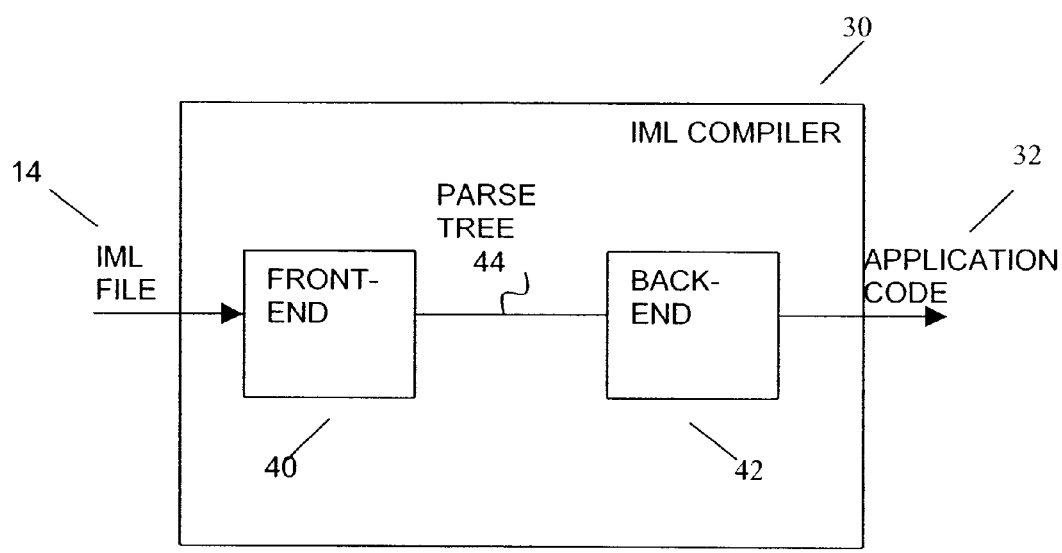
FIG. 4 is a schematic view of an IML compiler in accordance with the principles of the invention.

IML is a language for specifying distributed applications such as, for example, Web-based applications. An IML application development environment includes the IML compiler 30 and, optionally, a graphical user interface tool for generating IML. Referring to FIG. 4, the IML compiler 30 has a front-end component 40 and a back-end component 42. The compiler front-end component 40 processes IML files into an internal representation known as a parse tree 44. The back-end component 42 processes the parse tree 44 into application code or code fragments in some language. For example, in a Java-based environment, the back-end 42 produces Java code as application code. IML does not specify the output format of the back-end component 42 since IML is intended to be used with any Web application environment.

The input to the IML compiler 30 is an IML application description (i.e., the IML file 14) which consists of a text file containing IML markup. IML can, for example be, implemented as an XML language. In an exemplary XML implementation, IML can use the XML namespace feature such that an IML application description file can also contain XML markup that is not part of the IML language.

A tag is a marker that identifies what the data are which are associated with the tag, and may be composed of a character string enclosed in special characters, reserved words, or other syntax that distinguishes the tag from associated data. "Special characters" typically refer to characters other than letters and numbers, which are defined and reserved for use with tags. Special characters are used so that a parser processing the data stream will recognize that this a tag. A tag is normally inserted preceding its associated data; a corresponding tag may also be inserted following the data, to clearly identify where that data end.

In an exemplary XML implementation, IML tags use the name-space "iml" (e.g. <iml:operation>). The use of name spaces permits application and environment-specific tags to be added to the IML description.

Using XML markup makes it easy to construct an IML compiler using existing XML parsing and transformation tools. However, none of the essential features of IML as described here depends on the use of XML markup. The uniqueness of IML does not depend on the use of XML to specify interface definitions. Rather, IML is unique because of the way it specifies application structure as a set of operations and entities. These features could easily be we represented in some other syntax, such as the C-like syntax used by other interface definition languages.

The IML application description (i.e., the IML file) is hierarchical, consisting of several sections and subsections, each delimited by IML tags. At the top level is an application tag, which names the application and encloses all of the remaining sections. An application can contain one or more server description sections. Within each server section is a set of IML tags, which provide a detailed description of application structure, interfaces and flow for that server. Each application description consists of three sections each delimited by IML tags: a state list, an operation list, and an entity list.

A state list specifies application state that is maintained by the server on behalf of a specific application instance as a set of name-value pairs. The state list supports more efficient network usage by allowing application operations to refer to state data without having to transmit the data with each operation. IML does not specify how state is maintained by the server or how references are transmitted between server and client since this depends on the application environment.

An operation list specifies a series of remote operations supported by the application server. Each operation specifies a name which is used to invoke the operation on the server; a parameter list which describes a list of parameter names and default values; and a result list which describes the IML entities which can be returned as a result of each operation. IML does not specify how operations are invoked or implemented by the server. Typically, in a Web-environment, operations are invoked as HTTP requests.

The entity list describes the set of entities which constitute the user-visible interface to the application. An entity consists of a unit of markup returned by the server to the client as a result of invoking an operation. For example, in a Web application, an entity is typically a Web page. In a WAP application, an entity is typically a WML deck. Each entity can be divided into fragments. For example, in a WAP application a fragment would typically be represented by a WML card. Each fragment contains a list of invoke tags that specify the IML operations that can be invoked from that fragment, as well as navigation tags that describe navigation that does not involve invoking an IML operation (such as navigation among fragments of the same entity).

The IML file implicitly describes the application state flow because each entity lists the operations that it can invoke and each operation specifies the entities that can result from calling the operation. The IML implicitly describes potential presentation in terms of entities and fragments, but IML does not specify any specific presentation. The goal is for a single IML description to function as source for any presentation model, such as HTML or WML, in any application development environment.

Figure 5:
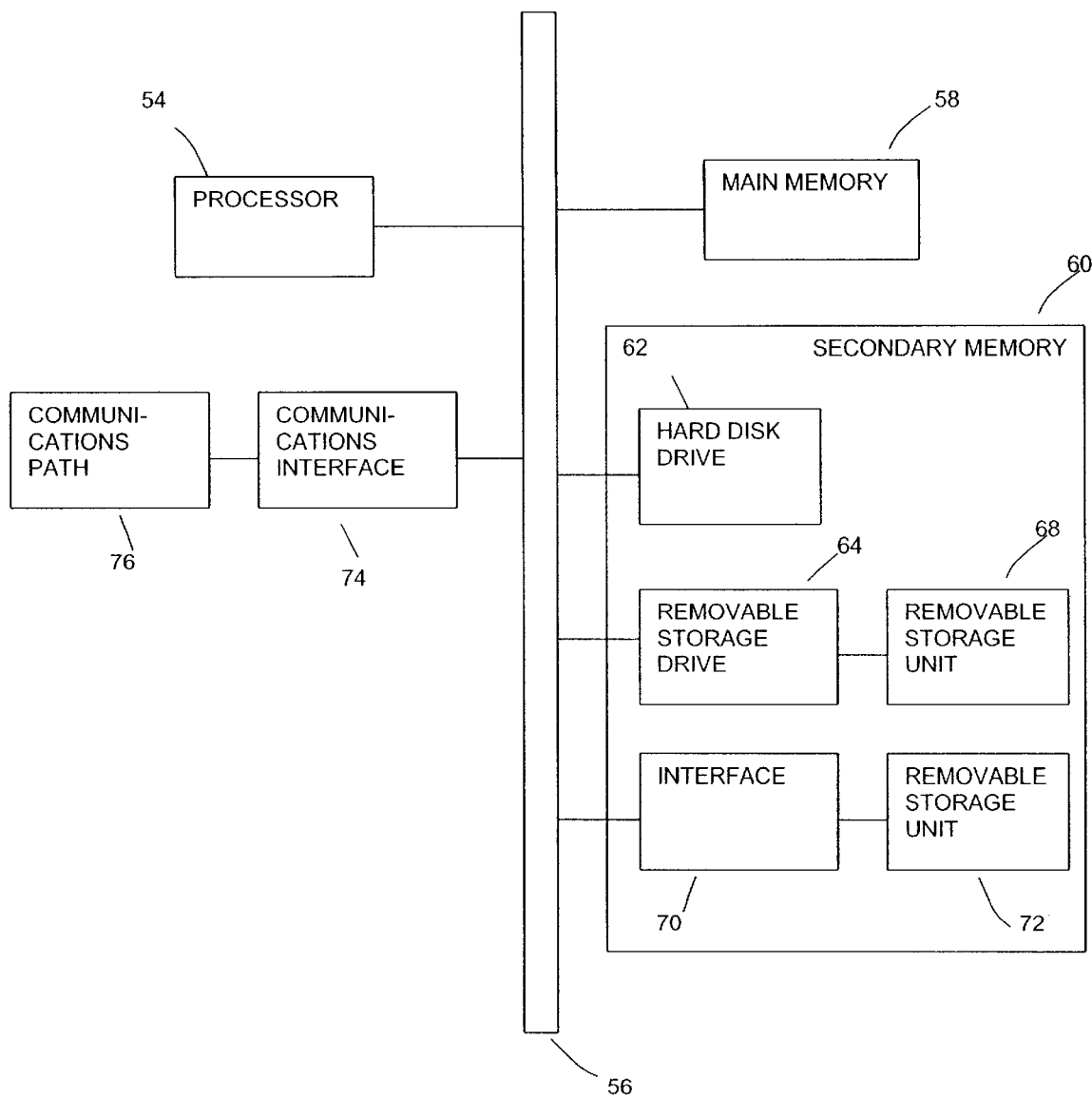
FIG. 5 is a schematic view of an exemplary computer system in which the invention can be practiced.

Referring to FIG. 5, the IML generating unit 10 of the present invention may be implemented using hardware, software or a combination thereof and may be implemented in a computer system or other processing system. In an illustrative embodiment, the invention is directed toward one or more computer systems capable of carrying out the functionality described herein. An example computer system 50 is shown in FIG. 5. The computer system 50 includes one or more processors, such as processor 54. The processor 54 is connected to a communication bus 56. Various software embodiments are described in terms of this example computer system. After reading this description, it will become apparent to a person skilled in the relevant art how to implement the invention using other computer systems and/or computer architectures.

Computer system 50 also includes a main memory 58, preferably random access memory (RAM), and can also include a secondary memory 60. The secondary memory 60 can include, for example, a hard disk drive 62 and/or a removable storage drive 64, representing a floppy disk drive, a magnetic tape drive, an optical disk drive, etc. The removable storage drive 64 reads from and/or writes to a removable storage unit 68 in a well-known manner. Removable storage unit 68 represents a floppy disk, magnetic tape, optical disk, etc. which is read by and written to by removable storage drive 64. As will be appreciated, the removable storage unit 68 includes a computer usable storage medium having stored therein computer software and/or data.

In alternative embodiments, secondary memory 60 may include other similar means for allowing computer programs or other instructions to be loaded into computer system 50. Such means can include, for example, a removable storage unit 72 and an interface 70. Examples of such include a program cartridge and cartridge interface (such as that found in video game devices), a removable memory chip (such as an EPROM, or PROM) and associated socket, and other removable storage units 72 and interfaces 70 which allow software and data to be transferred from the removable storage units to computer system 50.

Computer system 50 can also include a communications interface 74. Communications interface 74 allows software and data to be transferred between computer system 50 and external devices. Examples of communications interface 74 can include a modem, a network interface (such as an Ethernet card), a communications port, a PCMCIA slot and card, etc. Software and data transferred via communications interface 74 are in the form of signals which can be electronic, electromagnetic, optical or other signals capable of being received by communications interface 74. These signals are provided to communications interface 74 via a communications path 76. This communications path 76 carries signals and can be implemented using wire or cable, fiber optics, a telephone line, a cellular telephone link, an RF link and other communications channels.

In this document, the terms "computer program medium" and "computer usable medium" are used to generally refer to media such as removable storage unit 68, a hard disk installed in hard disk drive 62, and communications path 76. These computer program products are means for providing software to computer system 50.

Computer programs (also called computer control logic) are stored in main memory 58 and/or secondary memory 60. Computer programs can also be received via communications interface 74. Such computer programs, when executed, enable the computer system 50 to perform the features of the present invention as discussed herein. In particular, the computer programs, when executed, enable the processor 54 to perform the features of the present invention. Accordingly, such computer programs represent controllers of the computer system 50.

In an embodiment where the invention is implemented using software, the software may be stored in a computer program product and loaded into computer system 50 using removable storage drive 64, hard drive 62 or communications interface 74. The control logic (software), when executed by the processor 54, causes the processor 54 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example, and not limitation. It will be apparent to persons skilled in the relevant arts that various changes in form and detail can be made without departing from the spirit and scope of the invention.

What is claimed is:

1. A method for generating application code comprising:
   receiving a non-executable flow diagram of an application;
   generating an interface markup language (IML) text file based on the application flow diagram, the IML text file containing operations and entities specifying a structure of the application; and
   generating application code or code fragments for the application based on the IML text file.

2. The method according to claim 1, further comprising generating the application flow diagram by a user, the application flow diagram being generated based on abstract user elements and operations that the abstract user elements invoke.

3. The method according to claim 1, wherein the syntax of the IML is defined by Extensible Markup Language (XML) language rules.

4. The method according to claim 1, further comprising generating the IML text file using a graphical user interface tool.

5. The method according to claim 1, wherein the IML text file is hierarchical comprising sections and subsections delimited by IML tags.

6. The method according to claim 5, wherein the IML text file comprises a state list section, the state list section specifying one or more states of the application maintained by a server on behalf of a specific application instance as a set of name-value pairs.

7. The method according to claim 6, wherein the state list allows application operations to refer to state data without having to transmit the data with each operation.

8. The method according to claim 5, wherein the IML text file comprises an operation list section, the operation list section specifying a series of remote operations supported by an application server.

9. The method according to claim 8, wherein each said operation specifies a name that may be used to invoke the operation on a server.

10. The method according to claim 8, wherein each said operation specifies a parameter list that describes a list of parameter names and default values.

11. The method according to claim 8, wherein each said operation specifies a result list that describes IML entities that may be returned as a result of each said operation.

12. The method according to claim 5, wherein the IML text file comprises an entity list section, the entity list section describing a set of said entities that constitute a user-visible interface to the application.

13. The method according to claim 12, wherein each said entity comprises a unit of markup returned by a server to a client as a result of invoking one of said operations.

14. The method according to claim 12, wherein at least one of said entities comprises a web page.

15. The method according to claim 12, wherein at least one of said entities comprises a Wireless Markup Language (WML) deck.

16. The method according to claim 1, wherein each entity comprises one or more fragments, each fragment containing a list of invoke tags that specify an IML operation that may be invoked from the fragment and navigation tags that describe navigation that does not involve invoking an IML operation.

17. The method according to claim 16, wherein at least one of said entities comprises a WML deck and each fragment comprises a WML card.

18. An apparatus comprising a storage medium with instructions stored therein, the instructions when executed causing a processing device to perform:
receiving a non-executable flow diagram of an application;
generating an interface markup language (IML) text file based on the application flow diagram, the IML text file containing operations and entities specifying a structure of the application; and
generating application code or code fragments for the application based on the IML text file.

19. The apparatus according to claim 18, wherein the syntax of the IML is defined by Extensible Markup Language (XML) language rules.

20. The method according to claim 19, wherein the IML text file is hierarchical comprising sections and subsections delimited by IML tags.

21. The method according to claim 20, wherein the IML text file comprises a state list section, the state list section specifying one or more states of the application maintained by a server on behalf of a specific application instance as a set of name-value pairs.

22. The method according to claim 21 wherein the state list allows application operations to refer to state data without having to transmit the data with each operation.

23. The method according to claim 20, wherein the IML text file comprises an operation list section, the operation list section specifying a series of remote operations supported by an application server.

24. The method according to claim 23, wherein each said operation specifies a name that may be used to invoke the operation on a server.

25. The method according to claim 23, wherein each said operation specifies a parameter list that describes a list of parameter names and default values.

26. The method according to claim 23, wherein each said operation specifies a result list that describes IML entities that may be returned as a result of each said operation.

27. The method according to claim 20, wherein the IML text file comprises an entity list section, the entity list section describing a set of said entities that constitute a user-visible interface to the application.

28. The method according to claim 27, wherein each said entity comprises a unit of markup returned by a server to a client as a result of invoking one of said operations.

29. The method according to claim 27, wherein at least one of said entities comprises a web page.

30. The method according to claim 27, wherein at least one of said entities comprises a WML deck.

31. The method according to claim 18, wherein each entity comprises one or more fragments, each fragment containing a list of invoke tags that specify an IML operation that may be invoked from the fragment and navigation tags that describe navigation that does not involve invoking an IML operation.

32. A processor for generating application code, the processor containing software comprising:
an interface markup language (IML) file generation module, the IML file generation module receiving a non-executable flow diagram of an application and generating an IML text file based on the application flow diagram, the IML text file containing operations and entities specifying a structure of the application;
a front-end compiler module, the front-end compiler module processing the IML text file into a parse tree; and
a back-end compiler module, the back-end compiler module processing the parse tree into application code for the application.

* * * * *